Oct. 25, 1966 L. G. SIMMS 3,280,879
VEHICLE TIRE VALVE SUPPORTING MEANS
Filed March 29, 1965
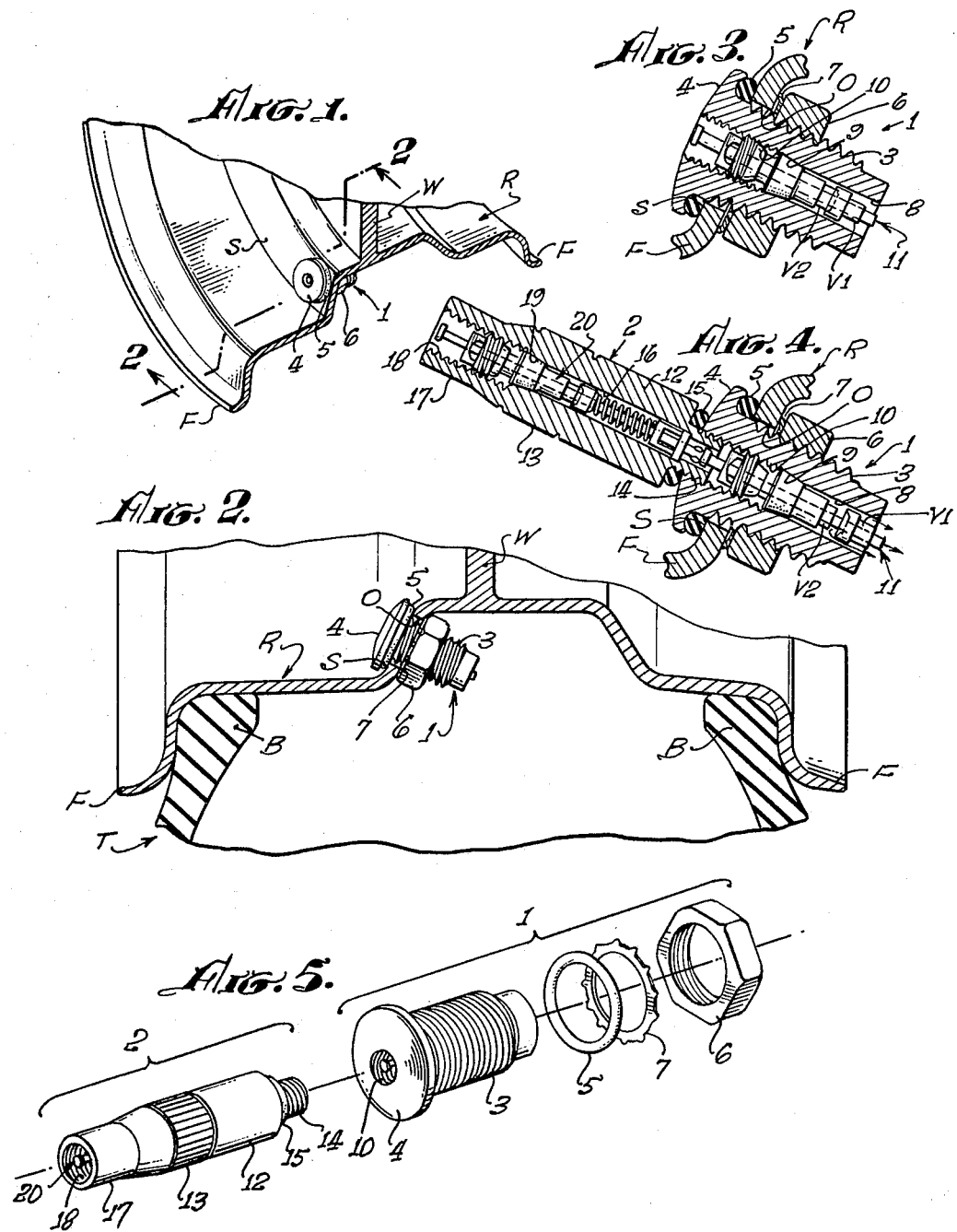
INVENTOR.
LEO G. SIMMS,
By
Harold J. DeVisconte
ATTORNEY United States Patent Office 3,280,879
Patented Oct. 25, 1966

3,280,879
VEHICLE TIRE VALVE SUPPORTING MEANS
Leo G. Simms, 1121 E. Chevy Chase Drive,
Glendale, Calif.
Filed Mar. 29, 1965, Ser. No. 443,220
3 Claims. (Cl. 152—427)

This invention relates to motor vehicle tire valve means particularly adapted to wheels having tubeless tires.

Automotive vehicle wheels for use with tubeless tires include a rim having a central peripheral rib portion to which the web extending between the rim and the hub is attached, and for convenience in description in the following specification, that central, peripheral rib portion will be referred to as the "felloe" portion of the rim. This felloe portion is provided with an opening through which air is introduced into the tire and outwardly of the felloe portion, the rim is customarily provided with lug means over which the hub caps are resiliently sprung. The hub caps are provided with an opening adjacent to the periphery thereof and the rim openings above mentioned has heretofore carried a valve stem member which extends through the hub cap opening for engagement by the usual air hose connection of the compressed air supply for inflating the tire.

Recently, particularly with sports cars, there has been a desire for ornamental wheels, per se, not employing the heretofore used hub caps and coupled with that desire there has been a further desire to dispense with the outwardly projecting valve stem and also to make the air supply opening as inconspicuous as possible. This, however, has presented the problem that in so doing, the air valve means is not capable of being served by the air hose connection found in service stations or garages.

With these considerations in mind, it is an object of the present invention to provide an air valve means for vehicle wheel rims mounting tubeless tires which means is practically flush with the exposed rim surface and consequently inconspicuous and which is, at the same time, capable of being serviced by the ordinary air hose connection found at vehicle service facilities.

Another object of the invention is to provide a device of the above character which is mountable in the valve stem mounting hole of the wheel rim.

Further objects of the invention are: to provide a device of the above character which is simple in design and construction; which is composed of few parts; which is capable of quick installation on existing wheels; is economical to manufacture; and which is effective for its intended purpose.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a fragmentary perspective view of a wheel rim showing the wheel rim mounted component of the device installed thereon, FIG. 2 is an enlarged transverse sectional view of the wheel rim taken on the line 2—2 of FIG. 1 showing the wheel rim attached component of the device as mounted in the valve stem receiving opening of the rim felloe, FIG. 3 is a further enlarged medial longitudinal sectional view of the component of the device as on the section line 2—2 of FIG. 1 showing the internal structure of the said component, FIG. 4 is a view similar to FIG. 3 but showing the air hose adapter component of the invention attached to the wheel mounted component thereof, and FIG. 5 is an exploded perspective view of both components of the invention and the mounting means for securing the wheel mounted component to the wheel rim.

Referring to the drawings, the illustrated embodiment of the invention is shown in association with a vehicle wheel rim R for a tubeless tire T, said rim having side flange portions F, F engaging the bead portions B, B of the tire. At its midwidth, the rim is formed with a wide shallow radially inwardly extending peripheral rib constituting the felloe portion of the rim, the outwardly directed side face S of said rib being provided with an opening O extending therethrough for reception of the valve means to which air is introduced to inflate the tire and the minor diametral portion of said rib being connected to the web W which extends between the rim and the hub of the wheel (not shown).

The illustrated embodiment of the invention comprises a wheel mounted component 1 and an air hose adapter component 2. The wheel mounted component 1 comprises a cylindrical, externally threaded body member 3 having a relatively thin, circular head portion 4 at one end thereof the outer end surface of said head portion preferably being smoothly rounded as best shown in FIG. 2. The diameter of the threaded body portion 3 is such as to freely but closely fit the valve stem opening O in the rim and an O-ring gasket 5 is interposed between the under face of the head portion 4 and the surface S of the rim and a nut 6 with an interposed lock washer 7 engages the threaded body 3 within the felloe groove to cause the head and gasket to form an air tight seal.

An axial bore 8 extends through the component 1, said bore at the outer end thereof being provided with a tapered seat portion 9 and an internally threaded portion 10 for removable reception of a standard short stem type of normally closed pressure responsive tire air valve 11 as best shown in FIGS. 3 and 4. As is well known, such valves include a spring biased axial stem means carrying a first valve member V1 which under the influence of the spring normally engages a second valve member V2 to prevent air flow through the valve, the normal excess of pressure in the tire above atmosphere pressure serving to combine with the bias imposed by the valve spring (not shown) to maintain the valve closed.

The air supply hoses for tire inflation at service stations and the like are all fitted with connector means adapted to engage over the exterior of a protruding valve stem and since the wheel mounted component above described does not have such a stem, other means presenting a stem with which air hoses can be engaged is provided. Said other means comprises the adapter component 2 including a generally cylindrical body member 12 preferably having at least a portion of the outer surface thereof knurled as at 13 to afford a nonslip surface. One end of said body is of reduced diameter and is externally threaded as at 14 to engage the internally threaded end 10 of the wheel mounted component 1, said threaded end carrying an O-ring gasket 15 which engages the surface of the head portion 4 to form an air tight seal between the components. The length of said reduced diameter portion of the adapter component 2 is such as not to engage the outer end of the valve 11 as best shown in FIG. 4 so that interference therewith is prevented and so that the gaskets 15 will be properly compressed between the opposing surfaces of the two components.

The body 12 has an axial bore 16 extending therethrough and the outer end 17 of said body is of reduced diameter and length adapted for engagement by the standard tire inflating fittings, and said bore 16 adjacent to said end 17 is provided with an internally threaded portion 18 and a tapered valve core engaging seat 19 to receive a standard, long type valve core 20, the length of the component 2 from the seat 19 to the end of the externally threaded end 14 being such that upon assembly of the adapter 2 to the wheel mounted component 1 as shown in FIG. 4, the stem of the valve core 20 will engage the stem of the valve 11 and will hold the latter valve open as shown in FIG. 4 while the valve core 20 remains closed. Thus, the attachment of the adapter has the effect of temporarily lengthening the valve stem represented by the component 1 and giving the outer end thereof the configuration required for attachment to standard air supply hoses.

In use, each car is supplied with one adapter component and as air is to be supplied to the tires, the adapter is attached to each of the components 1 while each wheel is being serviced. The inner valve core 11 being held open, the supplied air will need only to overcome the resistance of the outer valve core 20 and incident to the removal of the adapter, the valve core 11 will close. By means of this invention, on a wheel having an outer surface plated or otherwise decorated, any fancied disfigurement by the heretofore employed valve stem will have been eliminated. Moreover, the need for hub caps and the attendant worry over whether or not they may be stolen is also eliminated.

While in the foregoing specification, there has been described a presently preferred embodiment of the invention, such disclosure has been by way of example and, accordingly, it will be understood that the invention includes as well all such changes and modifications in the parts, and in the construction, combination and arrangement of parts as shall come within the purview of the appended claims.

I claim:

1. In a tire valve supporting means installable in the valve stem opening of a vehicle wheel rim on which a tubeless pneumatic tire is mounted; the combination of a valve core supporting body mounted in the rim opening and an adaptor means detachably connectable with said body; said body having an externally threaded portion disposed in said opening and having a relatively thin, flat head overlying the exterior surface of the rim around the valve stem opening and incapable, per se, of engagement with conventional air supply fittings for tire inflation, a gasket interposed between the adjacent faces of said head and the rim, a nut engaging said threaded body on the inner face of the rim effective to compress said gasket and seal the opening while securing said body in the rim opening, and an internally threaded axial bore extending through said body and carrying a valve core removably engaging the threads of said bore and said adaptor means including a cylindrical body having an axial bore extending therethrough terminating in means at one end thereof engageable with conventional air supply fittings for tire inflating and terminating in means at the opposite end thereof adapted for detachable connection to said head portion of said valve core supporting body in the vehicle wheel rim.

2. A tire valve supporting means as claimed in claim 1 in which said opposite end of said adaptor means is externally threaded to engage complementary threads in said bore in said body mounted in the vehicle wheel rim.

3. A tire valve supporting means as claimed in claim 2 in which said adaptor means includes a body having a bore extending therethrough, in which the end of said axial bore in said adaptor means opposite the externally threaded end thereof is internally threaded and is provided with seat means for removable reception of a valve core, and in which said seat means is so related in distance relative to said externally threaded end that upon being applied to said vehicle wheel rim mounted body, the valve component of a valve core mounted in said adaptor will engage and hold open the valve component of a valve core in said vehicle wheel rim mounted body.

References Cited by the Examiner

UNITED STATES PATENTS

| | | | |
|---|---|---|---|
| 694,638 | 3/1902 | Hart | 152—427 |
| 1,350,068 | 8/1920 | Cody | 152—429 |
| 2,579,657 | 12/1951 | Douglas | 152—415 |
| 2,913,035 | 11/1959 | Lapin et al. | 152—415 |

ARTHUR L. LA POINT, *Primary Examiner.*

C. W. HAEFELE, *Assistant Examiner.*